United States Patent [19]

Miyashita et al.

[11] 4,204,730

[45] May 27, 1980

[54] ELECTROPHOTOGRAPHIC APPARATUS

[75] Inventors: Kiyoshi Miyashita; Muneo Kasuga, both of Hachioji, Japan

[73] Assignee: Olympus Optical Co., Ltd., Tokyo, Japan

[21] Appl. No.: 962,799

[22] Filed: Nov. 21, 1978

[30] Foreign Application Priority Data

Nov. 24, 1977 [JP] Japan ............................... 52/139814

[51] Int. Cl.[2] ..................... G03G 15/00; G03B 27/48; G03B 27/70

[52] U.S. Cl. ..................................... 355/14 R; 355/51; 355/66

[58] Field of Search ..................... 355/66, 75, 3 R, 14, 355/3 SH, 8, 11, 47-51

[56] References Cited

U.S. PATENT DOCUMENTS 3,659,936 5/1972 Klose et al. .......................... 355/3 R
3,690,760 9/1972 Banks et al. ....................... 355/14 X
3,762,813 10/1973 Fowlie et al. ..................... 355/66 X
3,790,272 2/1974 Knechtel et al. ..................... 355/51
4,077,714 3/1978 Komori et al. .................... 355/66 X
4,084,904 4/1978 Ikeda ...................................... 355/66

*Primary Examiner*—Donald A. Griffin
*Attorney, Agent, or Firm*—Haseltine, Lake & Waters

[57] ABSTRACT

An electrophotographic apparatus for obtaining a plurality of duplicated copies based on an image-like modulating information formed on a photosensitive member by one exposure comprises a casing having a sheet document copying area and a thick document copying area, a document sensing device for sensing the presence of a document at these copying areas, and a mechanism for controlling a step of forming the image-like modulating information on the photosensitive member by a signal generated from the document sensing device when the document is present on both or one of the copying areas and a copying completion signal.

7 Claims, 6 Drawing Figures

ELECTROPHOTOGRAPHIC APPARATUS

BACKGROUND OF THE INVENTION

The present invention relates to an electrophotographic apparatus.

An electrophotographic apparatus for copying both a sheet document and a thick document such as books or the like has variously been developed. As an example, there is an apparatus provided with the so-called sheet feed device for feeding a sheet document by means of a roller or the like and a platen for thick document such as books on a movable document table, wherein the table is displaced to various positions, a stationary optical system is co-used, the document is moved in case of a sheet document and the table is moved in case of a thick document to expose and scan the document, and a copy is obtained. There are another apparatuses such that a sheet feed device is used as a main body to expose and scan the document by moving a platen plate on which a thick document is placed with the aid of a document feed mechanism, and an apparatus provided with an auto document feed device for automatically feeding sheet document.

Such prior electrophotographic apparatuses are to improve efficiency of sheet document copying on the same platen regardless of its construction. That is, the fundamental idea lies in that time loss of the reciprocatory action of a document table or scanning optical system is eliminated by successively scanning document by a sheet feed device. In this kind of devices, therefore, when each copy is obtained from a number of sheet documents, the document can quickly and advantageously be set. However, when a plurality (n) of copies are obtained from a number (m) of documents, it is necessary to expose and scan one document n times, so that the document should be fed m×n times. This is very inefficient and disadvantageous as compared with the device for repeating n exposing and scanning steps to only one document for m sheets by moving the optical system. When automatic setting is desired, 1-m sheets of copies are stacked for n times, which is also inconvenient. In case of copying a thick document such as book or the like, if n sheets of copies are obtained from one page, a next page cannot be put on the exposing and scanning surface until at least n sheets of copies are finished. In case of obtaining n sheets of copies from a number of pages, the time loss becomes considerably large for turning pages and setting document. Further, the device for moving a thick document platen with the aid of a document feeding mechanism in the sheet feed device is troublesome in operation and cannot be used for thick document in practice. The reciprocal step of an exposing and scanning system is carried out every time when the thick document is copied, so that this time loss cannot be avoided.

That is, in the prior electrophotographic apparatus for both sheet document and thick document, inefficient sheet document copying work has been improved by providing a sheet feed device for saving time loss caused by reciprocal movement of the exposing and scanning steps in sheet document copying, but new defects have been caused as described above, and particularly, the thick document copying work is still the same or rather troublesome in a certain kind of such devices.

On the other hand, there have been proposed various electrophotographic methods for obtaining a plurality of copies from an image-like modulating information formed by one exposure and scanning in these years. For instance, there is a method for obtaining a plurality of copies by forming an electrostatic latent image by uniformly charging, exposing and scanning an electrophotographic sensitive plate, developing the electrostatic latent image into a toner image, transferring the toner image to a recording paper without breaking the electrostatic latent image and thereafter repeating development and transfer.

SUMMARY OF THE INVENTION

An object of the present invention is to provide an electrophotographic apparatus properly constructed and arranged in such a manner that a plurality of copies are obtained from the aforementioned one exposure, i.e., an electrophotographic process having a memory property is carried out, various defects in the above-described copying operation are removed, and both the sheet document and the thick document are efficiently copied.

Another object of the present invention is to provide an electrophotographic apparatus properly constructed and arranged for efficiently carrying out copying with effective operation even in case of optionally setting either one of the sheet document or the thick document.

Further object of the present invention is to provide an electrophotographic apparatus properly constructed and arranged for efficiently copying a plurality of documents.

According to the present invention an electrophotographic apparatus comprises a photosensitive apparatus comprises a photosensitive member, a casing having a sheet document copying area and a thick document copying area provided on an upper surface thereof, means for detecting presence of a document at these copying areas, and a mechanism for controlling a step of forming an image-like modulating information on the photosensitive member by means of a signal generated from the document detecting means and a signal for informing completion of copying, whereby a plurality of duplicated copies are obtained based on the image-like modulating information formed on the photosensitive member by one exposure. An electrophotographic apparatus comprises a photosensitive member, a casing having a sheet document copying area and a thick document copying area provided on an upper surface thereof, a first document detecting means for detecting presence of document at the sheet document copying area, means for conveying the sheet document, a second document sensing means for detecting presence of the document at the thick document copying area, a movable exposing and scanning means for exposing and scanning the document present in these copying areas, the exposing and scanning means being fixed by a signal generated when the first document detecting means detects the presence of the document and a signal generated when the copying is completed in order to move the sheet document conveying means thereby to expose and scan the document, the exposing and scanning means being moved by a signal generated when the second document detecting means detects the presence of the document and a signal generated when the copying is completed to expose and scan the document, neither document being exposed and scanned or either one of the documents being exposed and scannned by a signal generated when both the first and the second document detecting means detect the presence of the documents and a signal generated when the copying is completed whereby an image-like modulating information is formed on the photosensitive member, and a plurality of duplicated copies are obtained based on the image-like modulating information formed on the photosensitive member by one exposure. An electrophotographic apparatus comprises a photosensitive member, a casing having a sheet document copying area and a thick document copying area provided on an upper surface thereof, means for detecting presence of a document at these copying areas, and a mechanism for starting a copying step by a signal generated when these document detecting means detect the presence of the document and a signal generated when the copying is completed and for starting a next document copying step by a signal generated from means for detecting the presence of a next document when the next document is set during a copying step of a previous document and a signal generated when the copying of the previous document is completed, to continuously copy a plurality of documents whereby a plurality of duplicated copies are obtained based on the image-like modulating information formed on the photosensitive member by one exposure. Use is made of a thick document exchange detecting section and a next copying step is started by a signal generated from the thick document detecting means when this detecting means detects the exchange of the document and a signal generated when the copying is completed. The signal of the thick document exchange detecting section is obtained by a closing and opening action of a document press cover. The signal of the thick document exchange detecting section is obtained by an action of a manual switch.

DESCRIPTION OF THE PREFERRED EMBODIMENT

Figure 1:
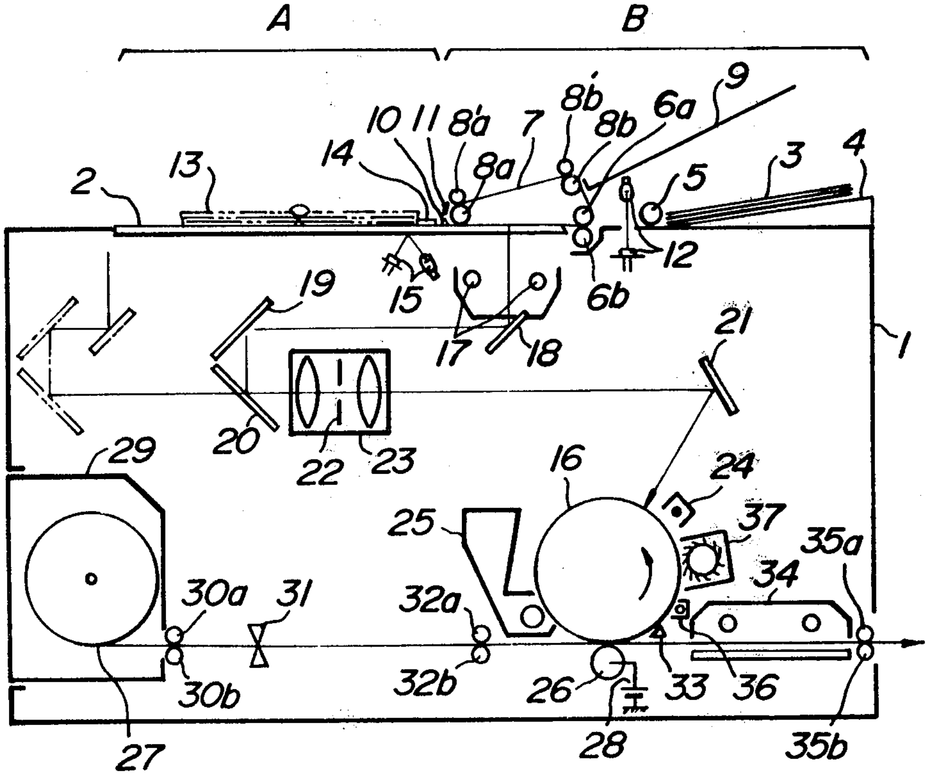
FIG. 1 is a diagram showing a construction of an electrophotographic apparatus according to the present invention.

Referring now to FIG. 1 one embodiment of an electrophotographic apparatus according to the present invention will be described. In this embodiment, on the upper surface of an outer casing 1 of the apparatus is secured a platen 2, and a sheet document copying area B and a thick document copying area A are provided by commonly using the platen 2. The sheet document copying area B (hereinafter referred to as area B) comprises a document receiver 4 for storing a sheet document 3 before copying around the platen 2, a feed roller 5 for feeding the sheet document one by one, document transfer rollers 6a, 6b arranged between the document receiver 4 and the platen 2, a document conveyor belt 7 wound to move at least in opposition to the platen 2 with the document transfer roller 6a inside, document conveyor belt driven rollers 8a, 8b arranged at the inside of the document conveyor belt 7, and an exhausted document stocker 9 for receiving the copied document at around the outside of the conveyor belt 7 so as to construct an automatic sheet document feeder as a whole. When a sheet document is fed in the document receiver 4, the feed roller 5 feeds the sheet document until the end of the sheet document is transferred between the document transfer roller 6b and the document conveyor belt 7 and stands still. When a plurality of sheet documents are fed on the document receiver 4, the feed roller 5 feeds these documents one by one, but the sheet documents after the second are fed after the previous sheet document is exhausted to the stacker 9 and the conveyor belt 7 stops to drive. In addition, the conveyor belt driven rollers 8a, 8b are arranged with press rollers 8'a, 8'b, respectively, through the conveyor belt 7, at around the driven roller 8a and on the platen 2 is provided a separating claw 10 for turning up the sheet document 3 conveyed along the platen 2, and there is also provided a document guide 11 for guiding the sheet document 3 turned up by the separating claw 10 between the press roller 8'a and the conveyor belt 7. In a conveying path for a sheet document between the feed roller 5 and the transfer roller 6a is provided a means for sensing or detecting the presence of the sheet document 3, such as a photoelectric type sheet document sensor 12.

The thick document copying area A (hereinafter referred to as area A) is a portion other than the area A of the platen 2 and this portion is wide enough to receive at least a copying surface of a thick document 13 placed thereon. On the platen 2 belonging to the area A is provided a document positioning member 14 and beneath the platen 2 is provided a means for sensing or detecting whether a document is placed on the area A, such as a photoelectric type thick document sensor 15.

Document images of the sheet documents 3 and the thick document 13 in the areas A and A are guided to a photosensitive drum 16 through a common exposing and scanning optical system provided in the casing 1. The exposing and scanning optical system comprises an illuminating lamp 17, reflection optical systems 18, 19, 20, 21 and a projection lens system 23 having an exposure amount adjusting iris 22 used as a shutter in common. If the sheet document 3 present in the area B is exposed and scanned the optical system is stopped at the position shown by a solid line as illustrated, the automatic sheet document feeder is actuated, document image of the sheet document 3 is projected on the photosensitive drum 16 and then an electrostatic latent image is formed thereon. When the thick document 13 in the area A is exposed and scanned, the illuminating lamp 17 and the reflection optical system 18, 19, 20 are moved to scan the document 13 and an electrostatic latent image corresponding to the document image is formed on the photosensitive drum 16. In this case, the relation of moving speed between the illuminating lamp 17 and the reflection optical system 18 and the reflection optical systems 19 and 20 is ½ in the latter to the former.

In the circumference of the photosensitive drum 16 is arranged a uniform corona charger 24 to uniformly charge the outer peripheral surface before receiving projection of the document image through the exposing and scanning optical system. Therefore, if projection of the document image is received after uniform charging, an electrostatic latent image corresponding to the document image is formed thereon. This electrostatic latent image is visualized into a toner image by means of a developing device 25 arranged around the photosensitive drum 16, and this toner image is transferred onto a recording paper 27 between the photosensitive drum 16 and a transfer roller 26 made into contact with the drum or arranged adjacent to the drum. To the transfer roller 26 is connected a bias voltage supply device 28. The recording paper 27 (roll-like recording paper in this embodiment) is put in a cassette 29 detachably provided in the casing 1, and cut into a predetermined length by a cutter 31 drawn out by draw rollers 30*a*, 30*b* synchronized with rotation of the photosensitive drum 16. The recording paper is then conveyed between the photosensitive drum 16 and the transfer roller 26 through conveyor rollers 32*a*, 32*b* and receives transfer of a toner image. A proper paper guide is arranged in order to transfer the recording paper 27. The recording paper on which the toner image is transferred is peeled off from the photosensitive drum 16 by a separation claw 33 and exhausted as a final duplicated copy from exhaust rollers 35*a*, 35*b* to the outside of the casing 1 through a fixing device 34.

In case of obtaining one duplicated copy by one exposure, after transferring a toner image onto a recording paper 27, an electrostatic latent image maintained on the photosensitive drum 16 is erased by actuating an erasing corona charger 36 arranged around the photosensitive drum 16, while after transfer a residual toner adhered to the photosensitive drum 16 is removed by actuating a cleaning device 37 arranged around the photosensitive drum 16, and preparation for forming next electrostatic latent image is completed. In case of obtaining a plurality of duplicated copies by one exposure, after an electrostatic latent image is formed and a desired number of transfers are repeated, the erasing corona charger 36 and the cleaning device 37 are actuated as described above.

Figure 2:
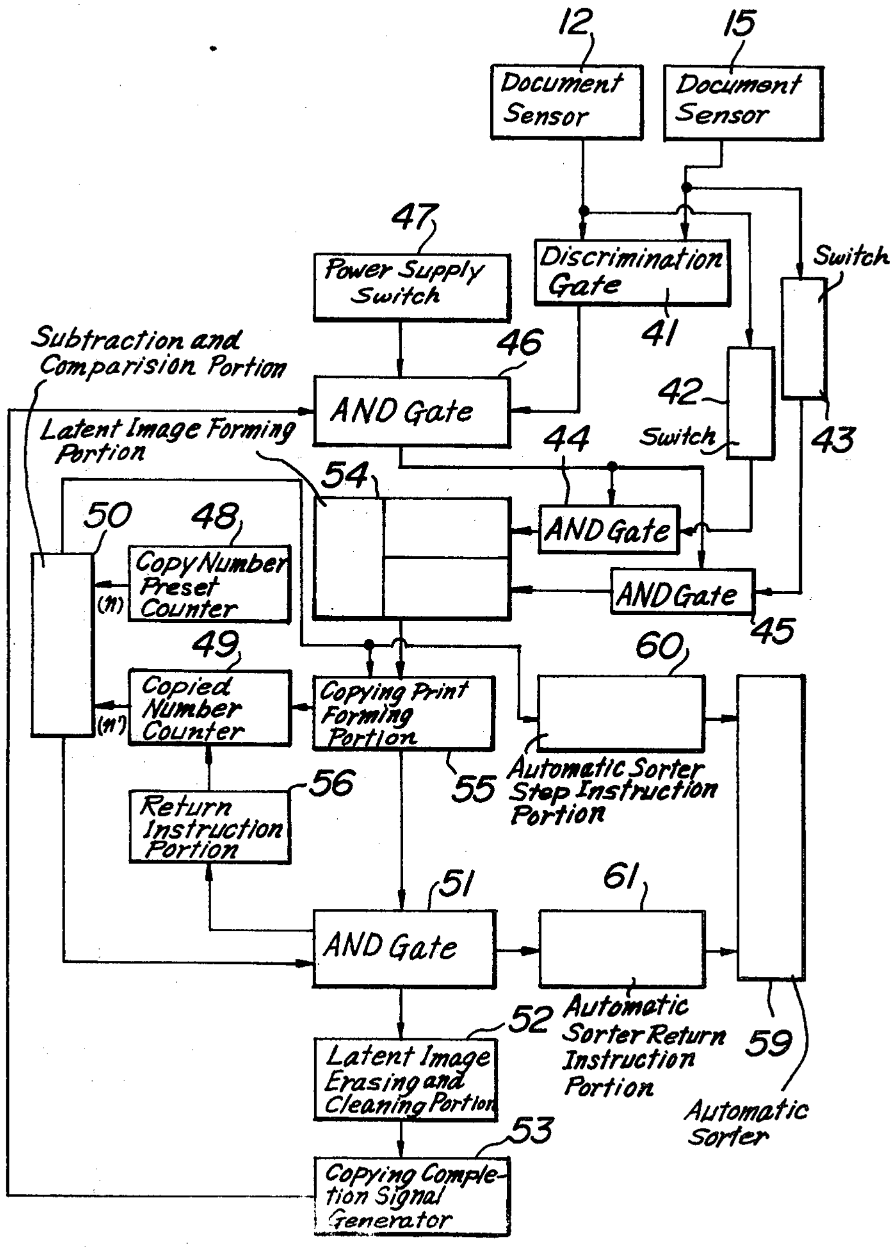
FIG. 2 is a block diagram showing a circuit for explaining the operation of the electrophotographic apparatus according to the present invention.
Figure 3:
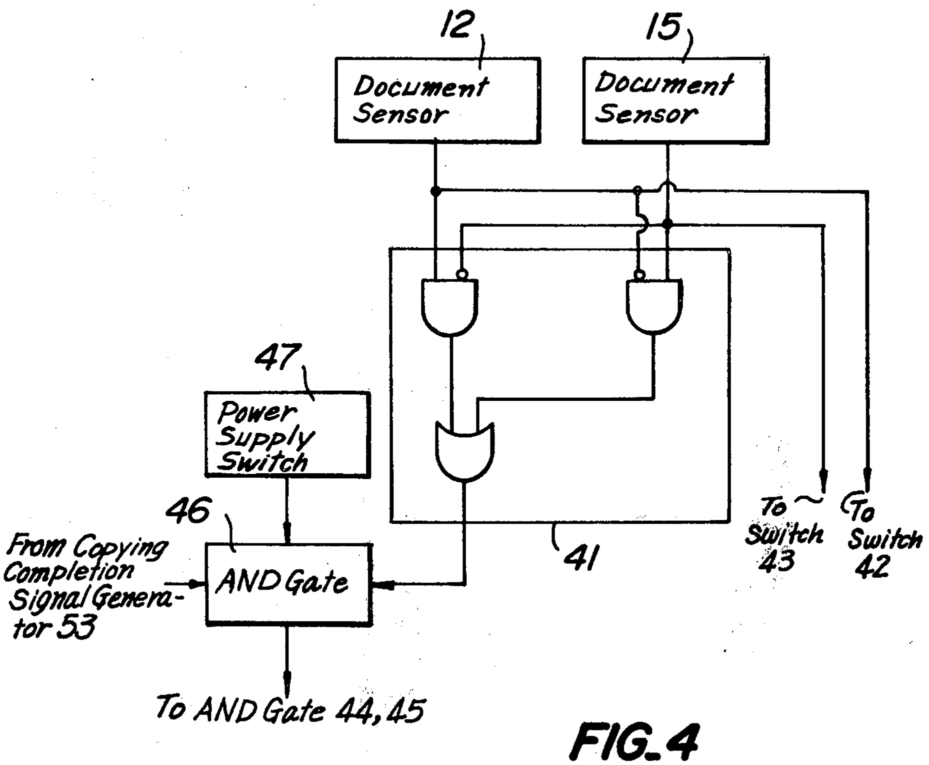
FIG. 3 is a block diagram showing a circuit of a discrimination gate shown in FIG. 2.

FIG. 2 is a block diagram showing one embodiment of a circuit for explaining how to drive the electrophotographic apparatus according to the invention. The action thereof is explained with reference to FIG. 1. Document detected signals generated from the document sensors 12, 15 in the areas A and B are supplied to a discrimination gate 41, respectively, and further supplied as copy starting signals to AND gates 44 and 45 through switches 42 and 43. The discrimination gate 41 supplies a document discrimination signal to the AND gate 46 only when the gate 41 receives the document discrimination signal from either one of the document sensors 12, 15. The discrimination gate 41, therefore, can be composed of an exclusive OR circuit as shown in FIG. 3. The AND gate 46 supplies respective gate signals to the AND gates 44 and 45 by three input signals of the document discrimation signal, an ON signal of a power supply switch 47 and a copying completion signal. The copying completion signal is generated from a copying completion signal generating portion 53 by comparing n number of sheets to be copied previously set in a copying number preset counter 48 and loaded to a subtraction and comparison portion 50 by copy starting with n' number of copied sheets counted by a copy number counter 49 with every copying by means of the subtraction and comparison portion 50, opening an AND gate 51 when both the contents agree to each other (n=n'), actuating an electrostatic latent image erasing and cleaning portion 52, and turning the photosensitive drum 16 to the initial state. That is, this copying completion signal is generated from the time when the erase corona charger 36 and the cleaning device 37 contained in the electrostatic latent image erasing and cleaning portion 52 are actuated to the photosensitive drum 16 and preparation of forming a next electrostatic latent image is completed. Therefore, when the power supply switch 47 is switched on the copying completion signal is generated and held unitl a first copying in the copying step is started and n number of sheets to be copied of the preset counter 48 is loaded to the subtraction and comparison portion 50.

As a copying action, an image-like modulating information forming portion, i.e., the electrostatic latent image forming portion 54 inclusive of an automatic sheet document feeder, an exposing and scanning optical system and a uniform corona charger 24 starts to actuate and an electrostatic latent image corresponding to the document image is formed on the photosensitive drum 16. In this case, if the sheet document 3 is charged or placed on the area B only, the sheet document sensor 12 detected the presence of the document, this detected signal supplies a document discrimination signal to the AND gate 46 through the discrimination gate 41, while a copy starting signal is supplied to the AND gate 44 through the switch 42. The AND gate 44 passes the copy starting signal by a gate signal supplied from the AND gate 46, thereby actuating the document conveyor belt 7 of the automatic sheet document feeder. In this case, the exposing and scanning optical system is not moved. If the thick document 13 is placed on the area A only, the thick document sensor 15 detects the presence of the document, this detected signal supplies a document discrimination signal to the AND gate 46 through the discrimination gate 41, while a copy starting signal is supplied to the AND gate 45 through the switch 43. This copy starting signal is fed to the electrostatic latent image forming portion 54 through the AND gate 45 by a gate signal supplied from the AND gate 46 in the same manner as in the sheet document, thereby moving the illuminating lamp 17, the reflection optical system 18, 19, 20 of the exposing and scanning system to expose and scan the thick document 13 placed on the platen 2. In addition, in exposing and scanning of either one of the documents, the exposure adjusting iris and shutter 22 is naturally effectively actuated.

When an electrostatic latent image is formed on the photosensitive drum 16 by actuating the electrostatic latent image forming portion 54 as described above, a copy print forming portion 55 is actuated to form duplicated copies by a number (n) preset on the copying number present counter 48 from the electrostatic latent image. This copy print forming portion 55 contains the developing device 25, the transfer roller 26, the recording paper 27, the transfer bias supplying device 28, draw rollers 30*a*, 30*b*, the cutter 31, the conveyor rollers 32*a*, 32*b*, the separation claw 33, the fixing device 34 and exhaust rollers 35*a*, 35*b*. A number (n') of duplicated copies obtained by actuating the copy print forming portion 55 are counted by the copied number counter 49 and compared with a preset value (n) of the copying number preset counter 48 by means of the subtraction and comparison portion 50. In this subtraction and comparison portion 50, if the preset value (n) is larger than the counted value (n'), the copy print forming portion 55 is continuously driven for repeatedly forming duplicated copies. When the preset value (n) coincide with the counted value (n'), the AND gate 51 is opend, the copied number counter 49 is reset through a return instruction portion 56, while the electrostatic latent image erasing and cleaning portion 52 is actuated against the photosensitive drum 16, and thereafter, a copying completion signal is supplied from the copying action completion signal generating portion 53 to the AND gate 46.

When a series of the copying ction for one document is completed as described above, if a document is set at either one of the area A or B, the AND gate 46 is again opened and a desired number of duplicated copies are successively obtained.

Figure 4:
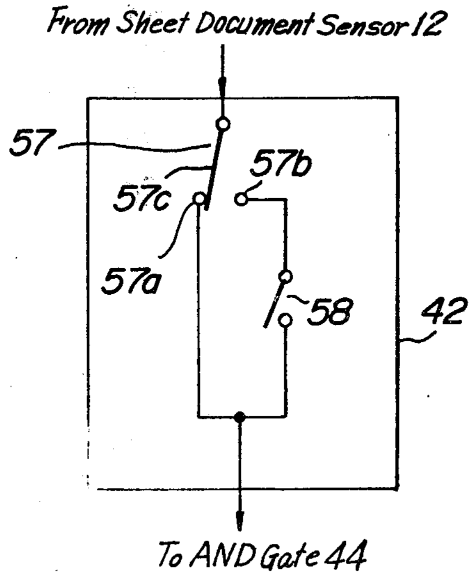
FIG. 4 is a circuit diagram showing a switch shown in FIG. 2.

In addition, in FIG. 2, the switch 42 controls copying start off of the sheet document 3 and can be constructed as shown in FIG. 4. That is, a document detected signal from the sheet document sensor 12 is supplied to the AND gate 44 through one contact *57a* of a holding type ON·OFF selection switch 57 through a normally off return type print switch 58. In FIG. 4, if a switch arm *57c* of the ON·OFF selection switch 57 is connected to the contact *57a*, the copying action is started by a sheet document sensing signal, and as a result, if a next sheet document is set when the previous copying step is carried out, as soon as the previous copying step is finished, the next sheet document is immediately copied by the completion signal. In this case, therefore, it is preferable to continuously copy sheet documents of the same size. Further, if the switch arm *57c* of the ON·OFF selection switch 57 is connected to the contact *57b*, even if the sheet document sensor 12 detects the presence of a document, the copying step is not started. In this case, a print switch 58 is instantly switched on for starting the copying step. In this case, therefore, it is preferable to obtain duplicated copies of difference sizes. That is, in case of copying a sheet document of A4 and copying a sheet document of B5 next, the switch arm *57c* is connected to the contact *57b* during the copying step of the sheet document of A4 and the sheet document of B5 is set, but the sheet document of B5 is not copied immediately after completing the copying step of the sheet document of A4. As a result, after completing the copying of the sheet document of A4, the size of the recording paper is changed to B5 or the number of sheets to be copied are newly set, and then the print switch 58 is made on for a short time and the copying step of the sheet document of B5 can be started.

Further, the switch 43 is for controlling the copying start of the thick document 13, composed of the switch similar to the normally off return type print switch 58 for the switch 42. This switch is manually operated to be ON for a short time so as to supply a copying start signal to the AND gate 45. Thus, this switch 43 effectively prevents the start of the copying step before the thick document 13 is not set at the correct position of the platen 2 of the area B. The switch 43 and thus the signal from the switch 43 is held by a holding circuit which is released by a signal based on the copying completion so that if a next document is set during copying step and the switch 43 is made ON state the copying of the next document can simultaneously be started with the completion of copying. If a first document is set and the switch 43 is made ON state the switch 43 is returned to OFF state after the signal is supplied to the AND gate 45 since the copying completion signal is present until a first copying of the copying step is started.

In FIG. 2, in order to couple an automatic sorting device 59, an automatic sorting step instruction portion 60 is controlled by a signal from the subtraction and comparison portion 50, and when the preset value (n) coincides with the counted value (n'), an automatic sorting return instruction portion 61 is actuated by a signal from the AND gate 51 and the automatic sorting device 59 is returned.

In the electrophotographic apparatus having the aforementioned construction according to the invention, one embodiment of the actual copying operation will be explained with reference to FIGS. 1 and 2 by taking the case of copying a thick document such as book as an example. At first, the power supply switch 47 is ON, a page of the thick document 13 to be copied is set along the document positioning member 14 on the platen 2 of the area A, and the desired number n of sheets to be copied are preset in the copying number preset counter 48. The thick document sensor 15 detects the already set thick document 13 and supplies a document detected signal to the discrimination gate 41 and the switch 43. At this time, if a document is not existent in the area B, i,e., the sheet document sensor 12 does not detect the presence of the sheet document, the discrimination gate 41 supplies a document discrimination signal to the AND gate 46. The copied number counter 49 has already been reset, and a copying completion signal is supplied to the AND gate 46 from the copying action completion signal generating portion 53 through the AND gate 51 and the like. Accordingly, the AND gate 46 is opened by an ON signal of the power supply switch 47, a document discrimination signal and a copying completion signal to supply a gate signal to the AND gates 44 and 45. If the switch 43 is made ON state at this time, the transfer start signal is supplied to the electrostatic latent image forming portion 54 through the AND gate 45 drives it to move the exposing and scanning optical system. That is, when the photosensitive drum 16 is rotated in the direction of an arrow, the uniform corona charger 24 is simultaneously actuated, and the movable optical system 17, 18, 19 and 20 is moved by synchronizing with the rotation of the drum to form an electrostatic latent image on the photosensitive drum 16. Following to the drive of the electrostatic latent image forming portion 54, the copying print forming portion 55 is driven and a duplicated copy is formed on the recording paper 27. This copying print forming portion 55 is repeatedly driven until the content of the subtraction and comparison portion 50 becomes n=n', and when the content becomes n=n', the electrostatic latent image erasing and cleaning portion 52 is driven, and thereafter a copying completion signal is supplied to the AND gate 46 from the copying action completion signal generating portion 53 and the copying action is completed. Accordingly, when the formation of the electrostatic latent image is finished, the thick document 13 on the platen 2 can be set to the next page. The timing of setting the next page can be instructed by another indication with a signal or the like based on the completion of the electrostatic latent image formation or if the switch 43 is constructed with a delay circuit or the like, it is not necessary to push the switch 43 again by monitoring the counter.

Figure 5:
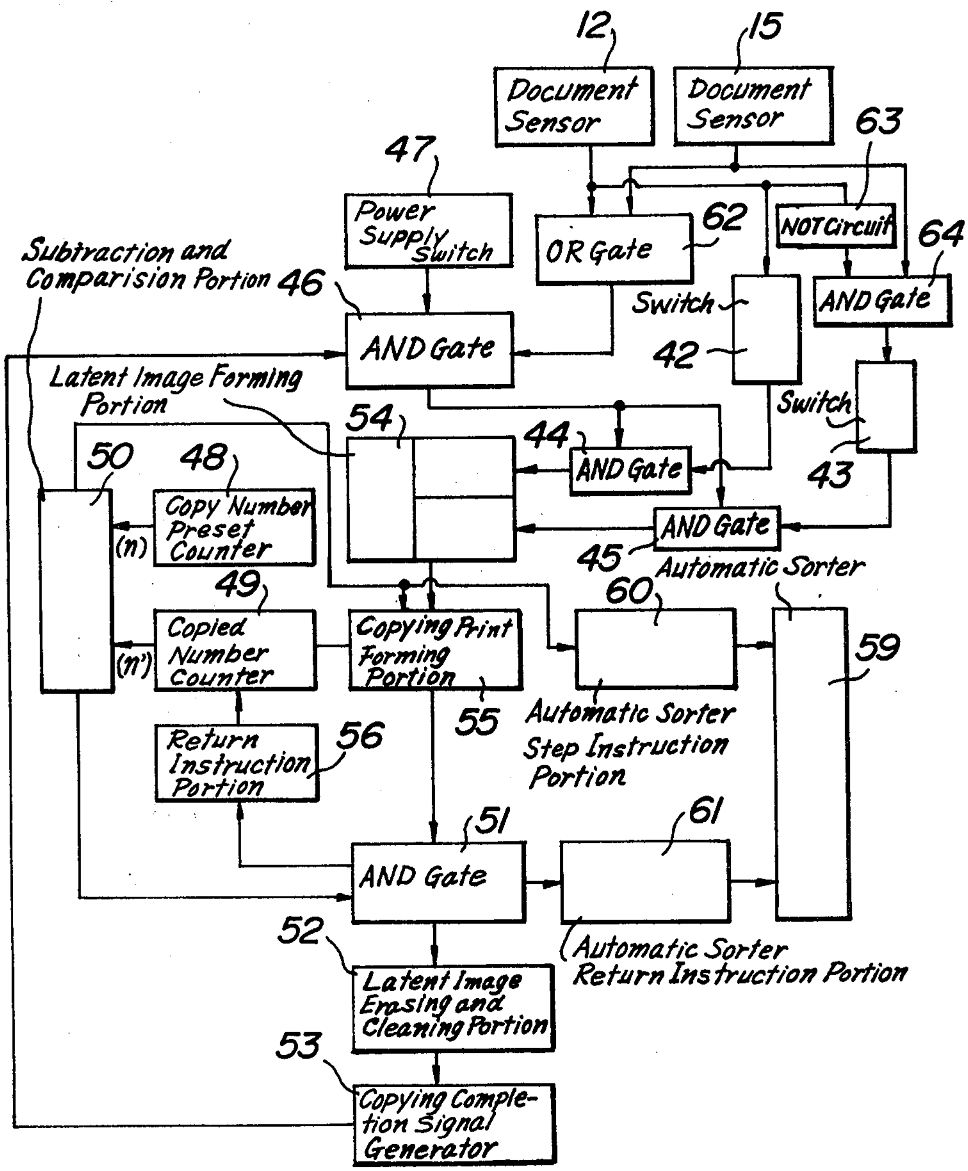
FIG. 5 is a block diagram showing a circuit for explaining the operation of another embodiment of an electrophotographic apparatus according to the present invention.

FIG. 5 is a block diagram of another embodiment of the electrophotographic apparatus according to the invention shown in FIG. 1 for explaining its action. In this embodiment, when both the sheet document sensor 12 and the thick document sensor 15 detect the presence of a document, the sheet document set at the area B is preferentially copied. In addition, like numerals shown in FIG. 5 act the same function as like numerals shown in FIG. 2. In FIG. 5, document sensing signals from the sheet document sensor 12 and the thick document sensor 15 are supplied to the OR gate 62, and when at least one of these sensors 12 and 15 detects the presence of the document, the output of the OR gate 62 is supplied to the AND gate 46 as a document discrimination signal. The document detected signal from the sheet document sensor 12 is supplied as a copying start signal to the AND gate 44 through the switch 42 and supplied to one input terminal of the AND gate 64 through a NOT circuit 63. To the other input terminal of the AND gate 64 is supplied a document detected signal from the thick document sensor 15. The output of the AND gate 64 is supplied as a copying start signal to the AND gate 45 through the switch 43. In FIG. 5, when both the sensors 12 and 15 supply document detected signals, a document discrimination signal is supplied to the AND gate 46 from the OR gate and a gate signal is supplied to the AND gates 44 and 45 from the AND gate 46. A copying start signal is supplied to the AND gate 44 from the switch 42, thereby driving the electrostatic latent image forming portion 54 and starting the copying step of the sheet document. In addition, if the document detected signals are supplied from both the sensors 12 and 15, the AND gate 64 cannot generate an output signal since the sheet document detected signal is denied by the NOT circuit 63, and as a result, even if the switch 43 is actuated, no copying start signal is supplied to the AND gate 45. The time when an output signal is generated from the AND gate 64 and a copying start signal is supplied to the AND gate 45, is in such a case that all the steps for copying the sheet document set at the area B are completed, the sheet document detected signal is not generated and the switch 43 is made ON state. Therefore, in the block diagram shown in FIG. 5, even if respective documents are simultaneously set in the areas A and B, the sheet document is preferentially copied, and even if a plurality of sheet documents are set in the area B, a thick document (or sheet document) can be set in the area A before the copying of the whole sheet document is completed, so that the copying operation can sufficiently be carried out.

Figure 6:
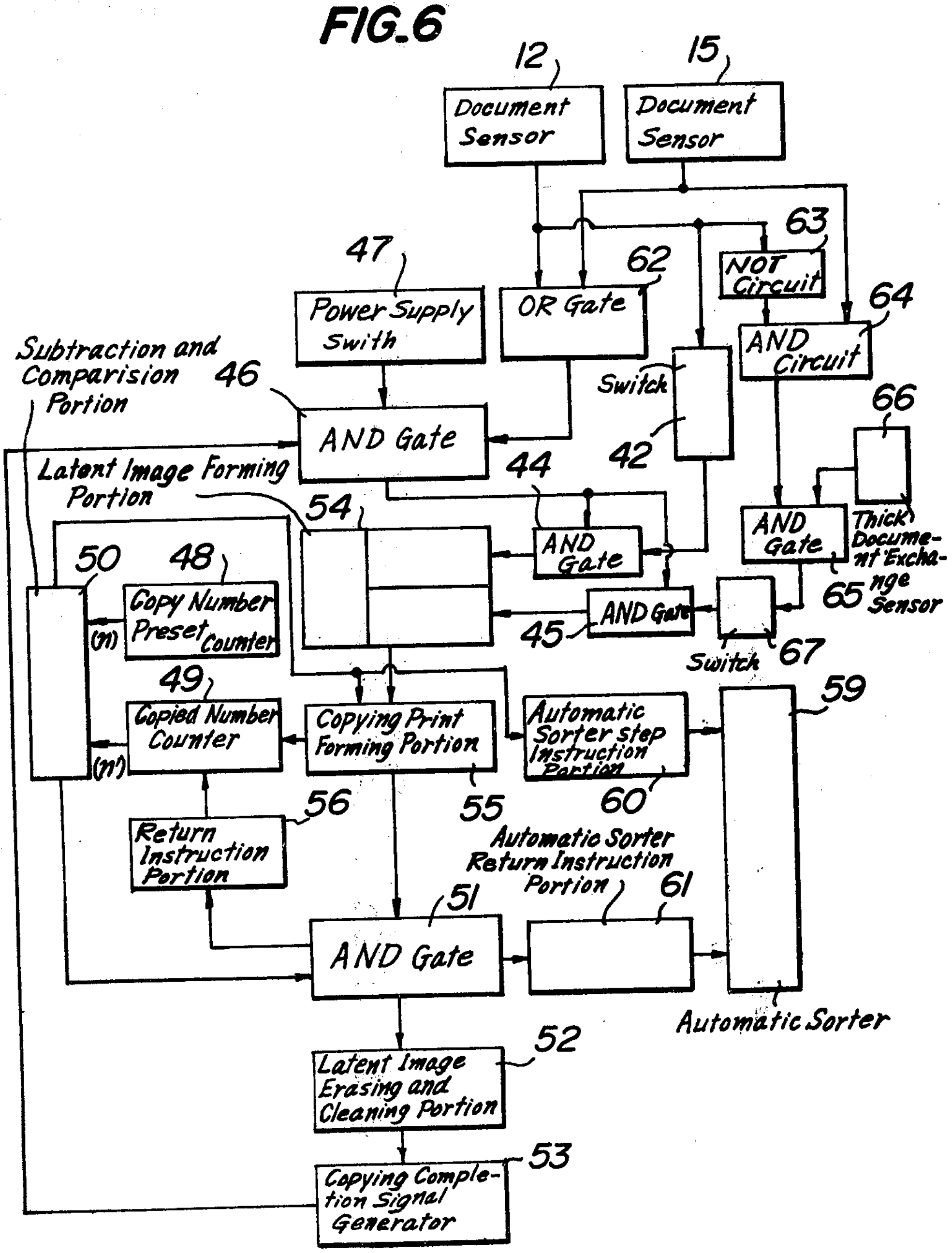
FIG. 6 is a block diagram showing a circuit for explaining the operation of further embodiment of an electrophotographic apparatus according to the present invention.

FIG. 6 is a block diagram of a further embodiment of the electrophotographic apparatus according to the invention shown in FIG. 1 for explaining its action. The block diagram shown in this embodiment differs from that shown in FIG. 5 in the point of supplying an output of the AND gate 64 to one input terminal of the AND gate 65, supplying an output signal from the thick document exchange sensing portion 66 to the other input terminal of the AND gate 65, and supplying the output of the AND gate 65 as a copying start signal to the AND gate 45 through the switch 67, and the like numerals act the same function as those shown in FIGS. 2 and 5. That is, in FIG. 6, the action of exchanging the thick documents such as books in the area B is detected by the thick document exchange sensing portion 66, and this signal and an output signal of the AND gate 64 serve to supply a copying start signal to the AND gate 45 from the AND gate 65 through the switch 67. The switch 67 here can be constructed in the same manner as the switch 42 for receiving a sheet document sensing signal as shown in FIG. 4. That is, when the thick documents are same sizes and same number of copies, the switch arm 57*c* is connected to the contact 57*a* in FIG. 4, and when the size and number of copies are different, the switch arm 57*c* is connected to the contact 57*b*, and the print switch 58 is properly made ON state to copy. In FIG. 6, after an electrostatic latent image of the previous document is formed in the area B, an exchange to the next document becomes possible, and this exchange action is sensed by the thick document exchange sensing portion 66 and an exchange sensed signal is supplied to the AND gate 65, and then immediately after a copying completion signal of the previous document is generated, the copying start of the next document becomes possible. In addition, an exchange sensed signal in the thick document exchange sensing portion 66 can be obtained by manually setting a signal after the exchange completion or obtaining a signal by providing a document press plate in the area B and based on its switching action.

As described above, according to the present invention, the sheet document copying area and the thick document copying area are provided on the upper surface of the casing of the apparatus, a document existent in either one of the copying areas is exposed and scanned only once by a signal generated when the document is present on these copying areas and a copying completion signal, thereby obtaining a plurality of duplicated copies from an electrostatic latent image formed thereon, so that both the sheet document and the thick document can efficiently be copied.

In the above construction according to the invention, respective documents in the sheet document copying area and the thick document copying area can be exposed and scanned by a single movable exposing and scanning means, and even respective documents are present in both the copying areas, the exposure of one of the documents is preferentially carried out, so that in case of obtaining a plurality of duplicated copies based on the electrostatic latent image formed by one exposure, time loss of the reciprocal step of the exposing and scanning means and the document operation can effectively be removed.

According to the invention, if a next document is set during the copying step of the previous document, the step of copying the document can immediately be started after completion of copying the previous document, and as a result, a plurality of documents can continuously be copied remarkably efficiency.

The invention is not limited to the above embodiments but can be changed and modified variously. For example, in the electrophotographic apparatus shown in FIG. 1, the exposing and scanning optical system is moved in case of exposing a thick document, but the exposing and scanning optical system is fixed and the platen 2 is moved. Further, in FIG. 2, the discrimination gate 41 can be constructed by a switching circuit based on a simple artificial operation or an alarm device or the like when the documents are simultaneously set in the areas A and B can be added. Further, in FIG. 1, as the developing device 25, the transfer system, the fixing system and the like, various systems can be employed, and a sheet-like photosensitive member can be used instead of the photosensitive drum 16.

What is claimed is:

1. An electrophotographic apparatus for forming image-like modulating information on a photosensitive member and obtaining a plurality of duplicated copies based on the image-like modulating information formed on the photosensitive member by one exposure and scanning of a document to be copied, said apparatus comprising: a casing having a sheet document copying area and a thick document copying area provided on an upper surface thereof, a first document detecting means for detecting presence of document at the sheet document copying area, means for conveying the sheet document, a second document sensing means for detecting the presence of the document at the thick document copying area, a movable exposing and scanning means for exposing and scanning the document present in these copying areas, a mechanism for controlling formation of image-like modulating information on the photosensitive member by means of a signal generated from at least one of the first and the second document detecting means and a signal for informing completion of copying, exposing and scanning means being fixed by a signal generated when the first document detecting means detects the presence of the document and a signal generated when the copying is completed in order to move the sheet document conveying means thereby to expose and scan the document, the exposing and scanning means being moved by a signal generated when the second document detecting means detects the presence of the document and a signal generated when the copying is completed to expose and scan the document, neither document being exposed and scanned or either one of the documents being exposed and scanned by a signal generated when both the first and the second document detecting means detect the presence of the documents and a signal generated when copying is completed.

2. An electrophotographic apparatus as claimed in claim 1, wherein: a thick document exchange detecting section is employed and a next copying step is started by a signal generated from the thick document detecting means when said detecting means detects the exchange of the document and a signal generated when the copying is completed.

3. An electrophotographic apparatus as claimed in claim 2, wherein: the signal of the thick document exchange detecting section is obtained by a closing and opening action of a document press cover.

4. An electrophotographic apparatus as claimed in claim 3, wherein: the signal of the thick document exchange detecting section is obtained by an action of a manual switch.

5. An electrophotographic apparatus for forming image-like modulating information on a photosensitive member and obtaining a plurality of duplicated copies based on the image-like modulating information formed on the photosensitive member by one exposure and scanning of a document to be copied, said apparatus comprising: a casing having a sheet document copying area and a thick document copying area provided on an upper surface thereof, a first document detecting means for detecting the presence of a document at the sheet document copying area, a second document sensing means for detecting presence of the document at the thick document copying area, and a mechanism for starting a copying step by a signal generated when these document detecting means detect the presence of the document and a signal generated when the copying is completed to start a next document copying step by a signal generated from means for detecting the presence of a next document, when the next document is set during a copying step of a previous document and a signal is generated when the copying of the previous document is completed, to thereby continuously copy a plurality of documents.

6. An electrophotographic apparatus as claimed in claim 5, wherein: a thick document exchange detecting section is employed and the signal thereof is obtained by a closing and opening action of a document press cover.

7. An electrophotographic apparatus as claimed in claim 5, wherein: a thick document exchanging detecting section is employed and the signal thereof is obtained by an action of a manual switch.

* * * * *